United States Patent
Watte et al.

(10) Patent No.: US 9,829,646 B2
(45) Date of Patent: Nov. 28, 2017

(54) FIBER OPTIC CONNECTOR HAVING AN OPTICAL FIBER THAT IS AXIALLY MOVEABLE WITHIN A FERRULE

(71) Applicant: TYCO ELECTRONICS RAYCHEM BVBA, Kessel-Lo (BE)

(72) Inventors: Jan Watte, Grimbergen (BE); Jan Vandenbroeck, Aarschot (BE); Danny Willy August Verheyden, Gelrode (BE); Stefano Beri, Zaventem (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 15/033,659

(22) PCT Filed: Nov. 4, 2014

(86) PCT No.: PCT/EP2014/073666
§ 371 (c)(1),
(2) Date: May 2, 2016

(87) PCT Pub. No.: WO2015/063317
PCT Pub. Date: May 7, 2015

(65) Prior Publication Data
US 2016/0252682 A1  Sep. 1, 2016

Related U.S. Application Data

(60) Provisional application No. 61/899,562, filed on Nov. 4, 2013.

(51) Int. Cl.
*G02B 6/38* (2006.01)
(52) U.S. Cl.
CPC ......... *G02B 6/3835* (2013.01); *G02B 6/3821* (2013.01); *G02B 6/3823* (2013.01);
(Continued)

(58) Field of Classification Search
CPC .. G02B 6/3835; G02B 6/3821; G02B 6/3843; G02B 6/3846; G02B 6/3847; G02B 6/3855
(Continued)

(56) References Cited

U.S. PATENT DOCUMENTS

| 4,153,331 A | * | 5/1979 | Cross | G02B 6/241 |
| | | | | 385/78 |
| 4,166,672 A | * | 9/1979 | Gilbert | G02B 6/3806 |
| | | | | 385/60 |

(Continued)

FOREIGN PATENT DOCUMENTS

| EP | 2 549 313 A1 | 1/2013 |
| EP | 2 549 314 A1 | 1/2013 |

(Continued)

OTHER PUBLICATIONS

International Search Report and Written Opinion for International Application No. PCT/EP2014/073666 dated Feb. 11, 2015 (10 pages).

*Primary Examiner* — Thomas A Hollweg
*Assistant Examiner* — Guy Anderson
(74) *Attorney, Agent, or Firm* — Merchant & Gould P.C.

(57) ABSTRACT

A fiber optic connector (20) including a ferrule (42) having a front end (48) and a rear end (50). The ferrule (42) defines an axial bore (46) that extends through the ferrule (42) between the front end (48) and the rear end (50). The ferrule (42) includes a ferrule axis (64) that extends along the axial bore (46). The fiber optic connector (20) includes an optical fiber (62) positioned within the axial bore (46) that is movable relative to the ferrule (42) within the axial bore (46) along the ferrule axis (64). The optical fiber (62) has fiber end face (63) that has been energy treated to round the fiber end face (63). A fiber alignment structure (66) can be attached at a front ferrule end face (54) of the ferrule (42).

(Continued)

A camera can be used to position a fiber end face (63) of the optical fiber (62) relative to the front ferrule end face (54) of the ferrule (42).

27 Claims, 18 Drawing Sheets

(52) U.S. Cl.
CPC ......... *G02B 6/3833* (2013.01); *G02B 6/3843* (2013.01); *G02B 6/3846* (2013.01); *G02B 6/3847* (2013.01)

(58) Field of Classification Search
USPC ...................................................... 385/53–94
See application file for complete search history.

(56) References Cited

U.S. PATENT DOCUMENTS

| | | | | |
|---|---|---|---|---|
| 4,190,317 | A * | 2/1980 | Makuch | G02B 6/3855 385/81 |
| 4,339,171 | A * | 7/1982 | Makuch | G02B 6/383 385/87 |
| 4,422,716 | A * | 12/1983 | Morimoto | G02B 6/3821 385/78 |
| 4,682,848 | A * | 7/1987 | Cairns | G02B 6/3816 385/69 |
| 4,854,663 | A * | 8/1989 | Borsuk | G02B 6/2552 385/33 |
| 5,035,482 | A * | 7/1991 | ten Berge | G02B 6/3508 385/16 |
| 5,081,694 | A | 1/1992 | Rhoese | |
| 5,394,498 | A * | 2/1995 | Hinterlong | G02B 6/3672 264/1.1 |
| 6,282,348 | B1 * | 8/2001 | Carlisle | G02B 6/3835 385/139 |
| 2002/0186931 | A1 * | 12/2002 | Seo | G02B 6/3875 385/60 |
| 2005/0141817 | A1 * | 6/2005 | Yazaki | G02B 6/3825 385/78 |
| 2008/0050073 | A1 * | 2/2008 | Kadar-Kallen | G02B 6/32 385/79 |
| 2010/0312104 | A1 * | 12/2010 | Ruchala | A61N 5/1049 600/426 |
| 2013/0163930 | A1 * | 6/2013 | Jian | G02B 6/36 385/60 |
| 2013/0177280 | A1 * | 7/2013 | Nielson | G02B 6/32 385/79 |
| 2013/0183005 | A1 * | 7/2013 | Lu | G02B 6/3887 385/78 |
| 2013/0266267 | A1 | 10/2013 | Li et al. | |
| 2015/0198773 | A1 * | 7/2015 | Nakama | G02B 6/3885 385/79 |
| 2016/0252682 | A1 * | 9/2016 | Watte | G02B 6/3823 |

FOREIGN PATENT DOCUMENTS

| | | |
|---|---|---|
| FR | 2 464 490 | 3/1981 |
| WO | WO 82/01077 | 4/1982 |
| WO | WO 2012/112344 | 2/2012 |
| WO | WO 2013/117598 | 8/2013 |
| WO | WO 2013/150089 | 10/2013 |

* cited by examiner

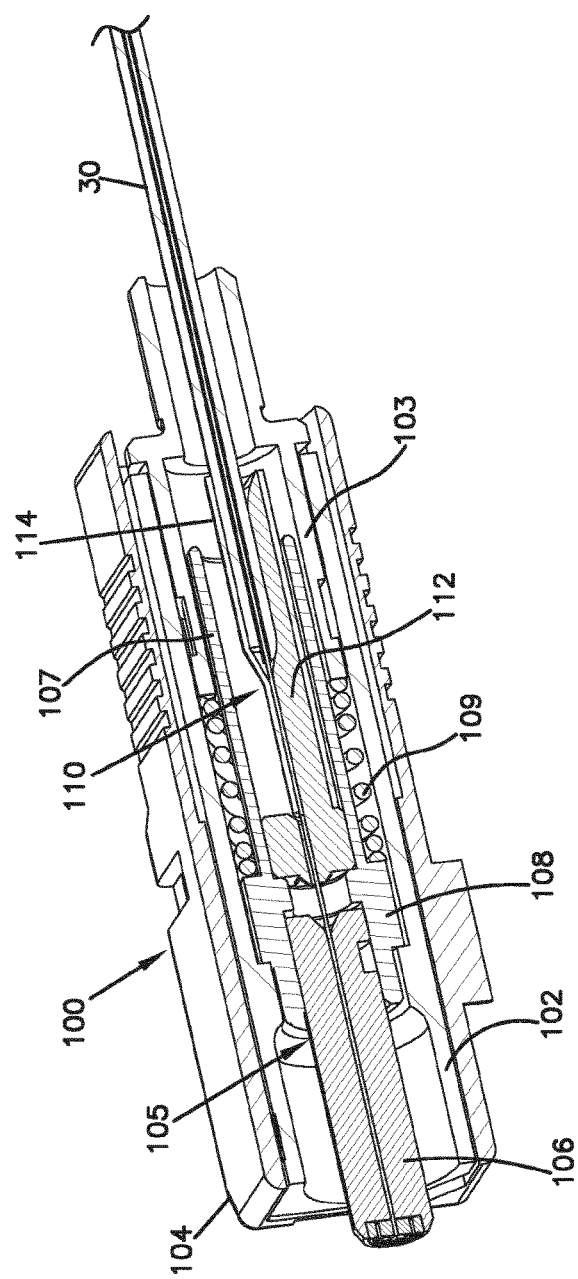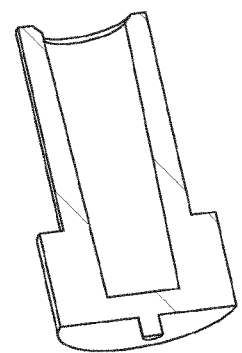
FIG. 16

FIBER OPTIC CONNECTOR HAVING AN OPTICAL FIBER THAT IS AXIALLY MOVEABLE WITHIN A FERRULE

CROSS-REFERENCE TO RELATED APPLICATION(S)

This application is a National Stage of PCT/EP2014/073666, filed 4 Nov. 2014, which claims benefit of U.S. Patent Application Ser. No. 61/899,562 filed on Nov. 4, 2013, and which applications are incorporated herein by reference in their entireties. To the extent appropriate, a claim of priority is made to each of the above disclosed applications.

TECHNICAL FIELD

The present disclosure relates generally to fiber optic connectors.

BACKGROUND

Modern optical devices and optical communications systems widely use fiber optic cables. A typical fiber optic cable includes one or more optical fibers contained within a protective jacket. Reinforcing structures such as aramid yarns and/or fiber reinforced epoxy rods can be used to provide reinforcement to the optical cables. It is well understood that a typical optical fiber includes a glass fiber processed so that light beams transmitted through the glass fiber are subject to total internal reflection wherein a large fraction of the incident intensity of light directed into the fiber is received at the other end of the fiber. A typical optical fiber includes a glass core surrounded by a cladding layer having a lower refractive index as compared to the refractive index of the core. The cladding causes light to be confined to the core by total internal reflection at the boundary between the two. The cladding layer of an optical fiber is often covered by one or more polymeric coatings (e.g., acrylate) to protect the glass and to facilitate handling of the optical fiber.

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a fusion splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule assembly includes a ferrule that functions to support an end portion of at least one optical fiber (in the case of a multi-fiber ferrule, the ends of multiple fibers are supported). The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter including an alignment sleeve that receives and coaxially aligns the ferrules of the fiber optic connectors desired to be interconnected. For certain styles of fiber optic connectors, the optical fibers are secured within their respective ferrules by a potting material such as epoxy. In other styles of fiber optic connectors, the optical fibers are free to slide axially relative to their corresponding ferrules.

SUMMARY

Aspects of the present disclosure relate to features, structures and methods adapted for enhancing the performance and manufacturability of fiber optic connectors having ferrules that support optical fibers and concurrently allow the optical fibers to slide or otherwise move axially relative to the ferrules. In one example, the optical fibers supported by the ferrules have end faces that are heat treated to provide better physical contact when connected and to enhance performance by improving the insertion loss and return loss characteristics of the connector. In certain examples, the end face of the optical fiber can be heat treated as a result of laser heating, laser radiation, plasma arc treatment, electric arc treatment or other heat treatment processes. In certain examples, the end face can be cleaved at a cleave angle (e.g., a perpendicular cleave or an angled cleave) and then subsequently heat treated to round the edges of the end face and in certain examples to round the cladding and the core of the fiber at the end face. In certain examples, the end face of the core is provided with a radius of curvature that is smaller than a corresponding radius of curvature provided to the cladding at the end face. In certain examples, heat treating the end face of the optical fiber eliminates the need for polishing of the end face of the optical fiber after cleaving.

Another aspect of the present disclosure relates to features, methods and structures for facilitating aligning an optical fiber within a ferrule. In certain examples, the optical fiber is moveable in an axial direction relative to the ferrule and an alignment structure is attached to the ferrule adjacent an end face of the ferrule. In certain examples, the alignment structure can include one or more alignment projections that facilitate aligning the optical fiber. In certain examples, the alignment projections extend in a radial direction relative to the optical fiber and the alignment structure has an elastic construction that allows the projections to elastically move radially when an optical fiber is inserted through the alignment structure. In certain examples, the alignment structure can be attached (e.g., glued, welded, fastened or otherwise secured) to the end face of the ferrule with a fiber passage of the alignment structure in alignment with an axial core of the ferrule.

A further aspect of the present disclosure relates to features, structures and equipment for positioning a moveable fiber within a ferrule. In certain examples, a camera is used to measure and detect the position of an end face of the optical fiber relative to an end face of the ferrule. Based on measurements established by the camera, the optical fiber can be automatically axially slid (e.g., via automation equipment that can be provided within a portable tool) relative to the ferrule to establish a desired positioning between the end face of the optical fiber and the end face of the ferrule. In certain examples, the end face of the optical fiber can be recessed relative to the end face of the ferrule. In other examples, the end face of the optical fiber can be flush relative to the end face of the ferrule. In still other examples, the end face of the optical fiber can be distally offset from the end face of the ferrule such that the fiber projects beyond the end face of the ferrule. In certain examples, once a desired positional relationship has been established between the ferrule end face and the fiber end face, the fiber can be axially locked in position relative to a connector body of the fiber optic connector. In certain examples, structures such as a shape memory sleeve (e.g., a heat shrink sleeve), a crimp or a mechanical clamp can be used to axially fix the optical fiber relative to the connector body. In certain examples, the fiber optic connector can include a fiber buckling region located between the end face of the ferrule and the fiber fixation location so as to provide space for allowing the optical fiber to buckle when its corresponding connector is connected to another connector. In certain examples, the camera can be incorporated within a portable tool that is also capable of stripping, cleaving and cleaning the optical fiber. In certain examples, the tool can also include structure for fixing the optical fiber relative to the connector body and attaching strength members of the fiber optic cable to the connector body.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

FIG. 16 is a longitudinal cross-sectional view of another example fiber optic connector using a second fiber fixation technique;

DETAILED DESCRIPTION

Figure 1:
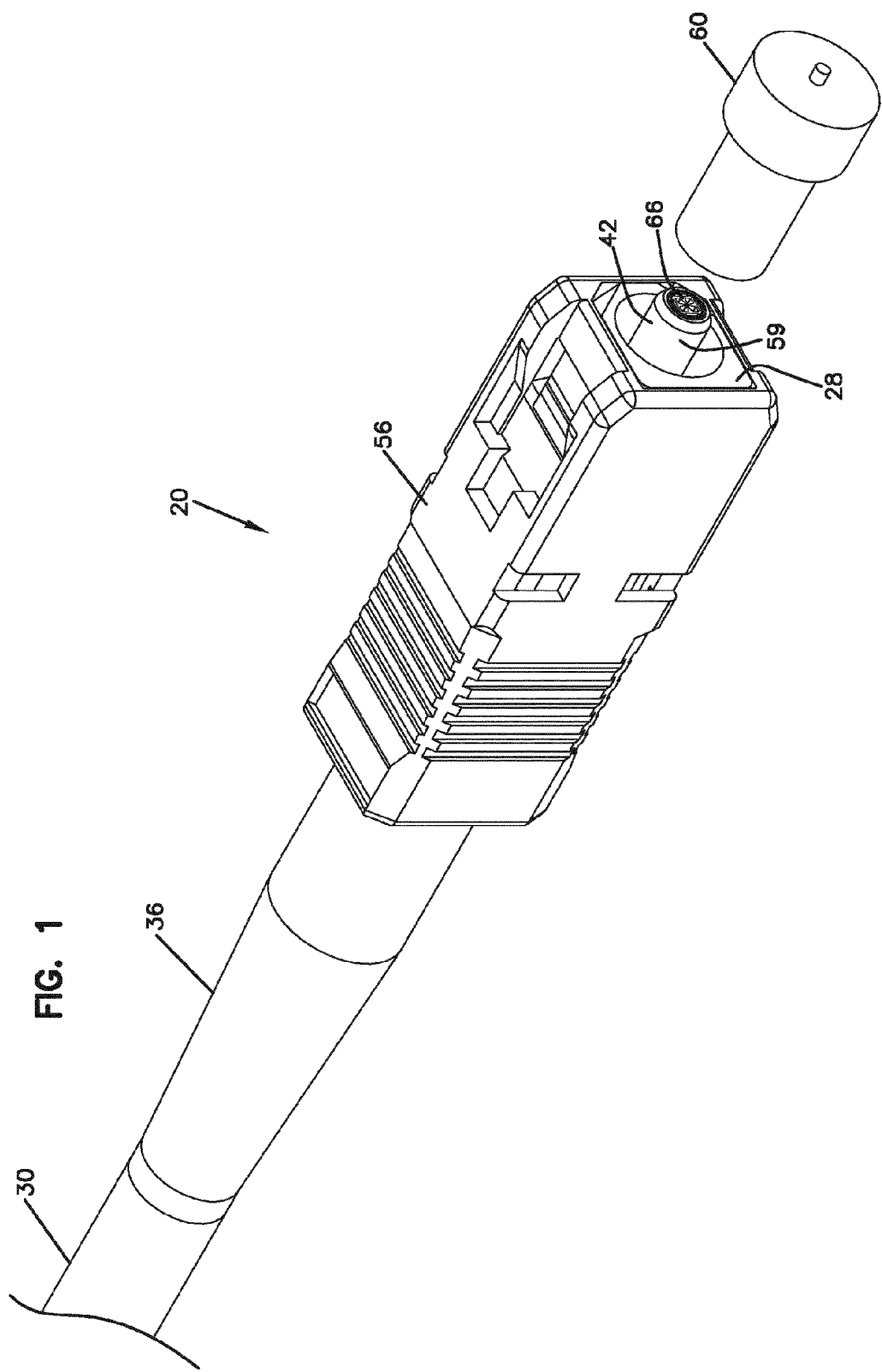
FIG. 1 is a perspective view of a fiber optic connector in accordance with the principles of the present disclosure.
Figure 2:
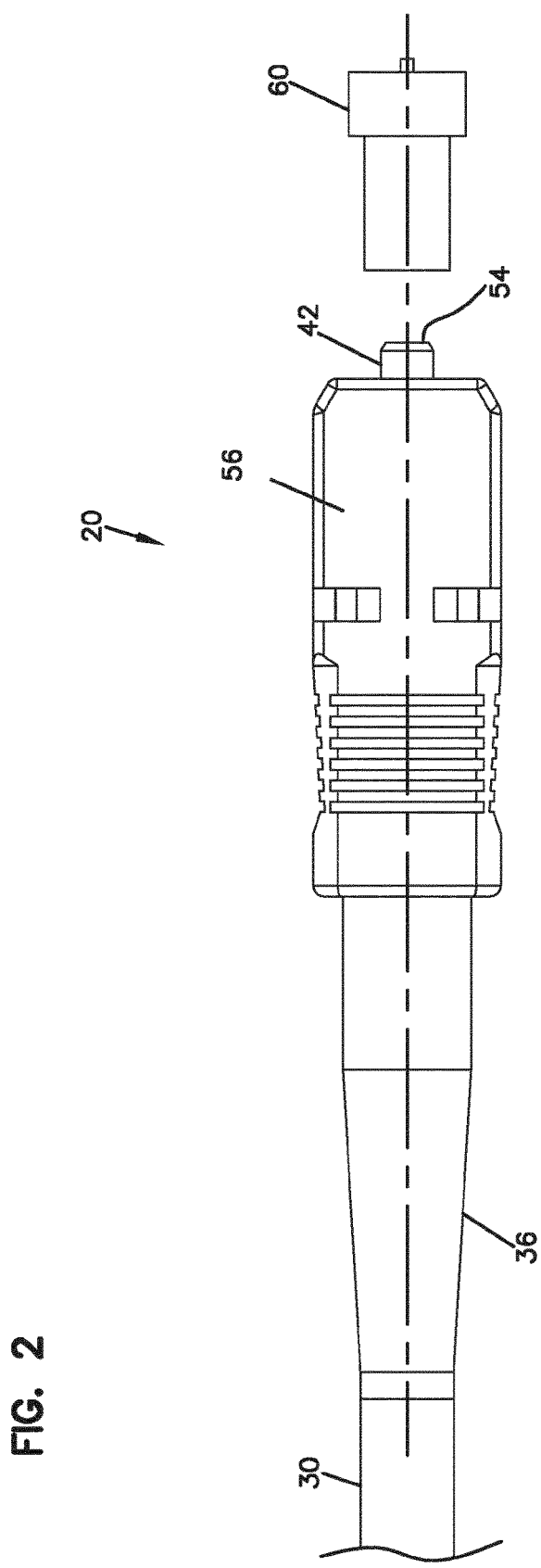
FIG. 2 is a top view of the fiber optic connector of FIG. 1.

FIGS. 1-5 illustrate a fiber optic connector 20 in accordance with the principles of the present disclosure. The fiber optic connector includes a connector body 22 including a front piece 24 and a rear piece 26 (see FIG. 3). The front piece 24 defines a plug end 28 of the fiber optic connector 20. The plug end 28 is adapted to be inserted within a fiber optic adapter. The rear piece 26 attaches to the front piece 24 (e.g., by a snap-fit connection). The fiber optic connector 20 is configured to be attached to the end of a fiber optic cable 30. The rear piece 26 includes a cable anchoring region 32 to which strength members (e.g., aramid yarn, fiberglass yarn, etc.) can be secured (see FIG. 4). In one example, a crimp sleeve 34 can be used to crimp the cable strength members to the cable anchoring region 32. The fiber optic connector 20 further includes a strain relief boot 36 that mounts at the interface between the fiber optic cable 30 and the rear piece 26. Strain relief boot 36 functions to provide bend radius protection to the fiber optic cable 30 at the interface between the fiber optic cable 30 and the fiber optic connector 20.

Figure 4:
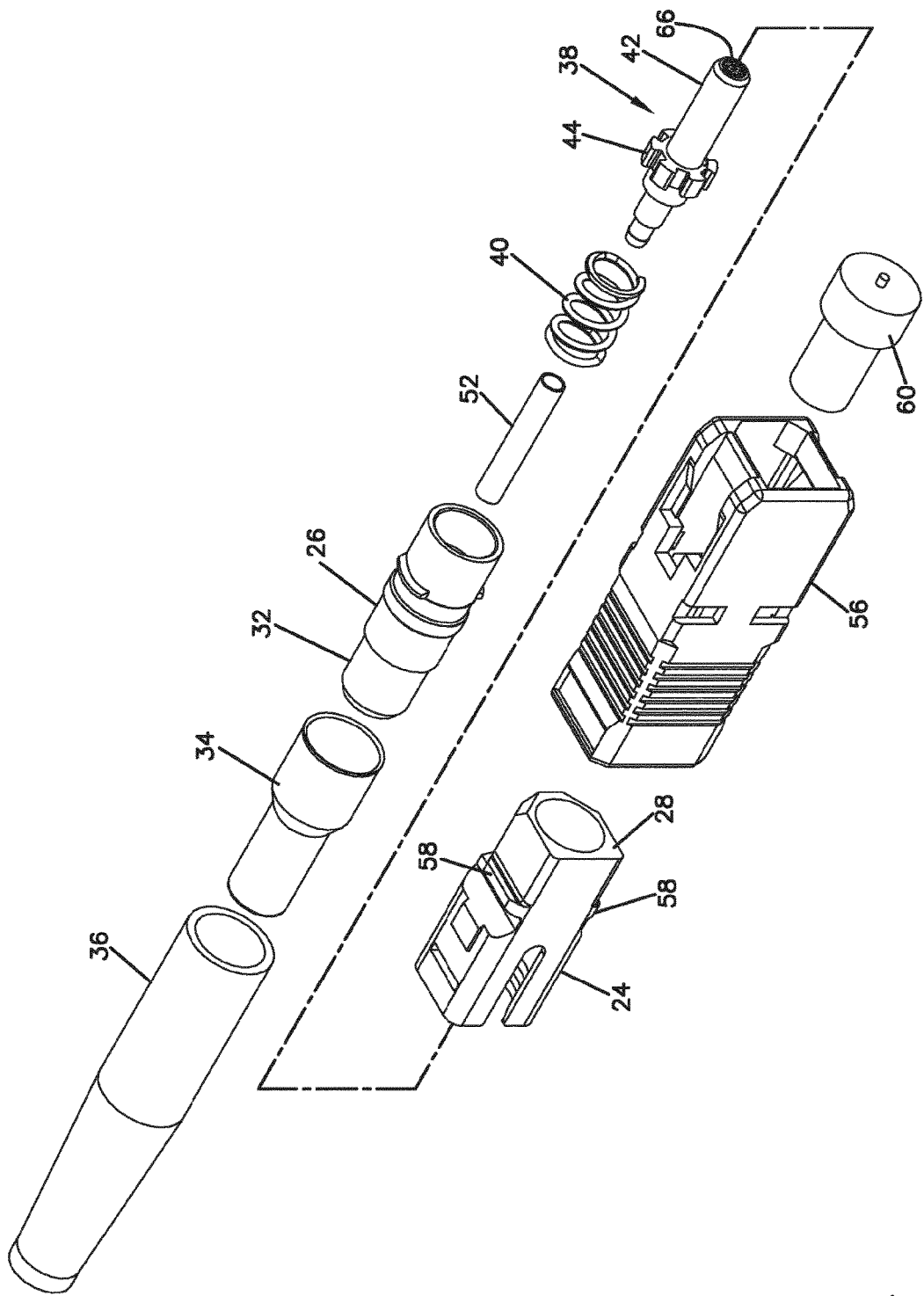
FIG. 4 is an exploded view of the fiber optic connector of FIG. 1.
Figure 5:
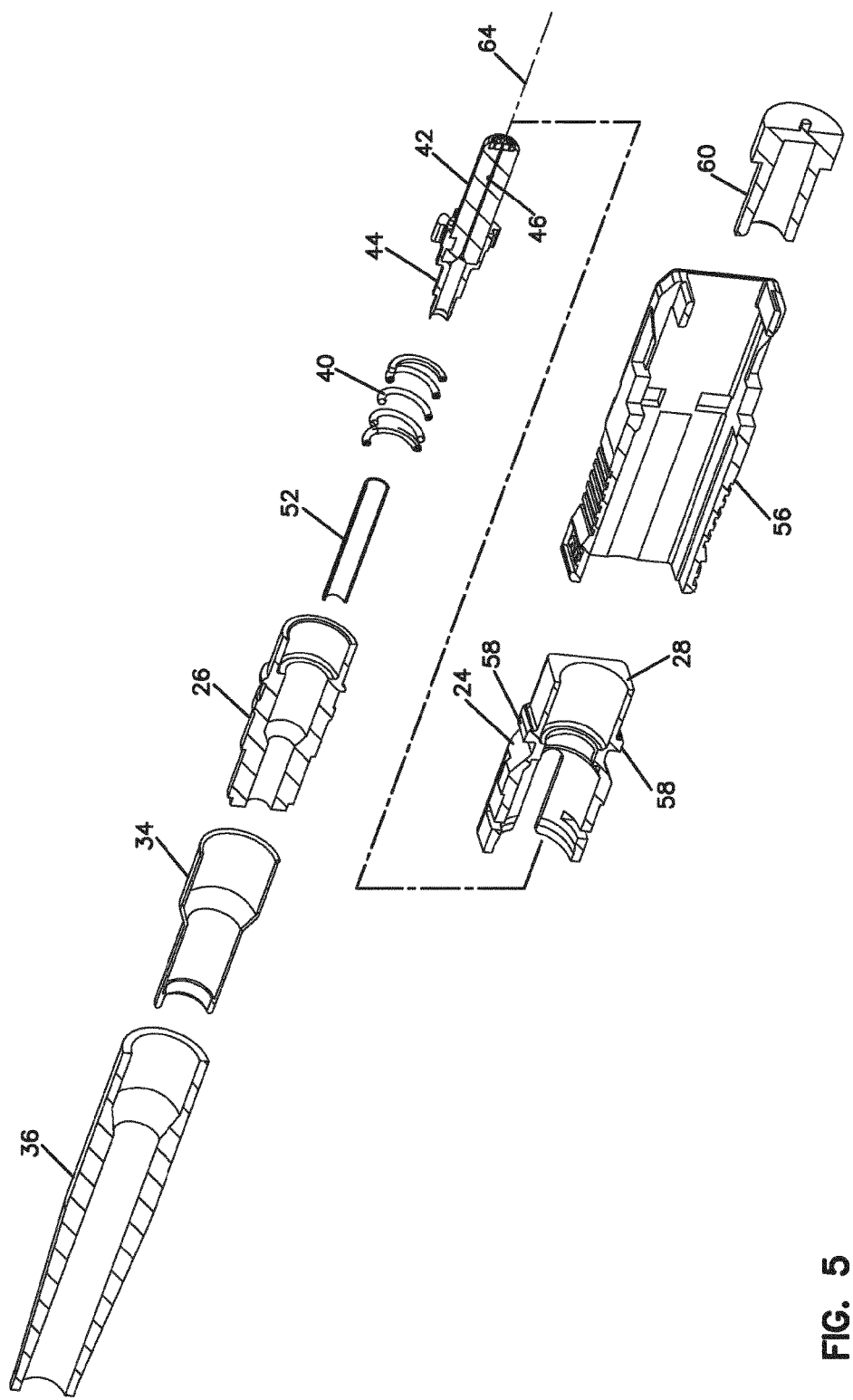
FIG. 5 is an exploded, cross-sectional view of the fiber optic connector of FIG. 1.

Referring to FIG. 4, fiber optic connector 20 also includes a ferrule assembly 38 and a spring 40 that mount within the interior of the connector body 22. The ferrule assembly 38 and the spring 40 are captured between the front and rear pieces 24, 26 of the connector body 22. The ferrule assembly 38 includes a ferrule 42 having a rear end mounted within a hub 44. The ferrule 42 defines an axial bore 46 that extends through the ferrule 42 from a front end 48 to a rear end 50. An elongated sleeve 52 mounts over a rear end of the ferrule hub 44. The spring 40 functions to bias the ferrule assembly 38 in a forward direction. When the ferrule assembly 38 is mounted within the connector body 22, a front ferrule end face 54 of the ferrule 42 is accessible at the plug end 28 of the front piece 24 of the connector body 22.

As depicted at FIG. 4, the fiber optic connector 20 is shown as an SC-style fiber optic connector with a release sleeve 56 that mounts over the connector body 22. The release sleeve 56 has a limited range of axial movement relative to the connector body 22 and is configured to facilitate releasing the connector body 22 from a fiber optic adapter. For example, once the fiber optic connector 22 has been inserted within the port of a fiber optic adapter, the release sleeve 56 can be retracted relative to the connector body 22 to disengage latches of the fiber optic adapter from corresponding shoulders 58 on the connector body thereby allowing the fiber optic connector 20 to be withdrawn from the adapter. It will be appreciated that aspects of the present disclosure are also applicable to other types of fiber optic connectors such as LC-style connectors, ST-style fiber optic connectors as well as other types of fiber optic connectors.

Referring still to FIG. 4, the fiber optic connector 20 also includes a dust cap 60 that mounts over the ferrule 42 to protect the front end face 54 when the fiber optic connector 20 is being transported or stored. When the fiber optic connector 20 is ready for use, the dust cap 60 is removed from the ferrule 42 thereby allowing the fiber optic connector 20 to be inserted into a corresponding fiber optic adapter without interference from the dust cap 60. In other examples, a pivoting shutter can be pivotally connected to the connector body 22 and used in place of the dust cap 60 to protect the ferrule when the connector is not in use. In such an example, the shutter can automatically pivot away from the ferrule when the connector is inserted into a fiber optic adapter.

Figure 3:
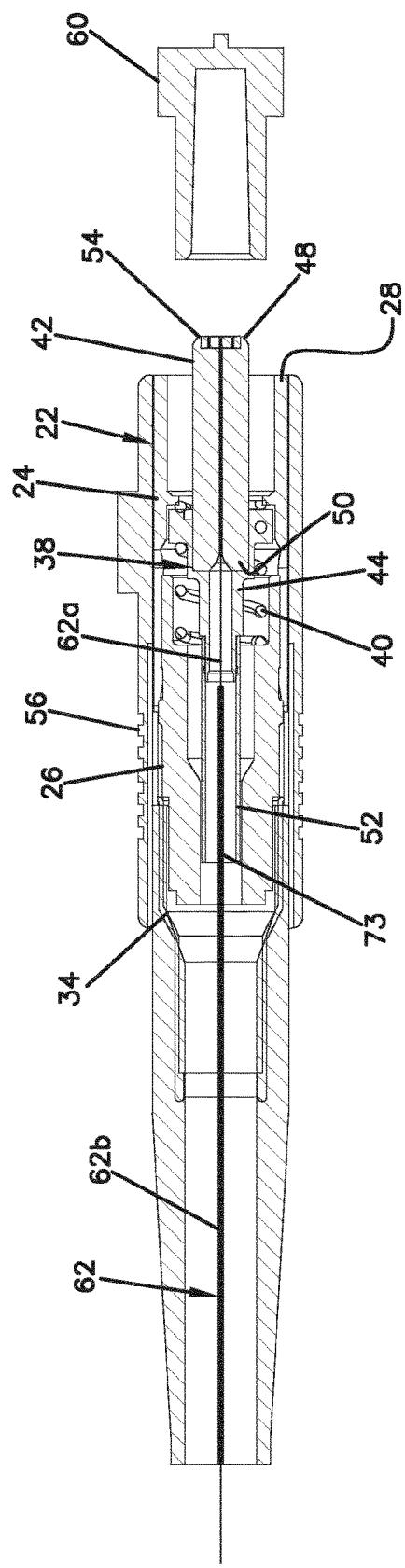
FIG. 3 is a cross-sectional view taken along section line 3-3 of FIG. 2.
Figure 12:
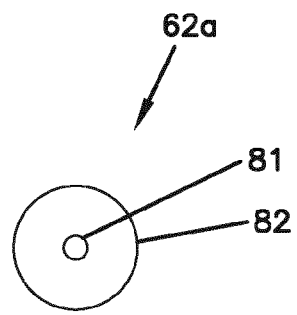
FIG. 12 is a cross-sectional view through a bare glass portion of the optical fiber.
Figure 13:
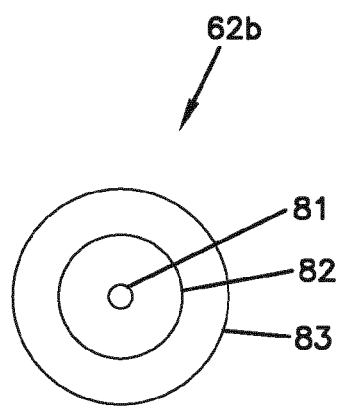
FIG. 13 is a cross-sectional view through a coated portion of the optical fiber.

Referring to FIG. 3, the fiber optic cable 30 includes an optical fiber 62 that extends through the connector body 22 and is inserted within the axial bore 46 of the ferrule 42. In certain embodiments, the optical fiber 62 is not fixed within the ferrule 42 by potting material such as epoxy. Instead, the optical fiber 62 is free to slide axially within the axial bore 46 along a ferrule axis 64 of the ferrule 42. In certain embodiments, the optical fiber 62 includes a bare glass portion 62a that extends through the ferrule 42 and a coated portion 62b that extends through the remainder of the connector body 22. In one example, the bare glass portion can have a diameter in the range of 120-140 microns and the coated portion can have a diameter greater than 230 microns. In certain examples, the bare glass portion 62a includes a core 81 (see FIG. 12) surrounded by a cladding layer 82, and the coated portion 62b includes the core 81, the cladding layer 82 and one or more coating layers 83 (see FIG. 13). The coated portion 62b can also include a loose or tight buffer layer surrounding the coating layer to provide additional protection.

Figure 6:
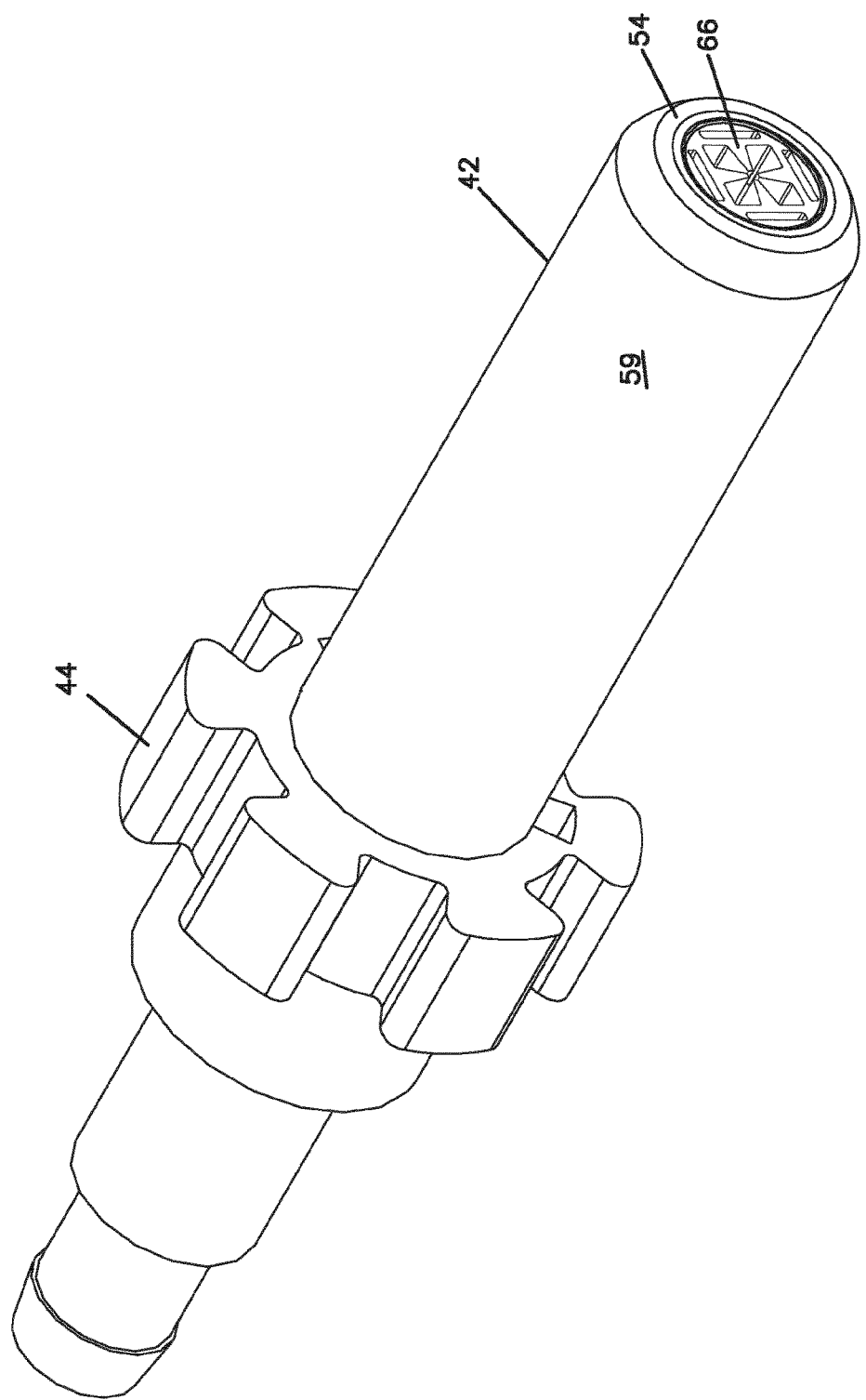
FIG. 6 is an enlarged view of the end face of the ferrule of the fiber optic connector of FIG. 1.
Figure 11:
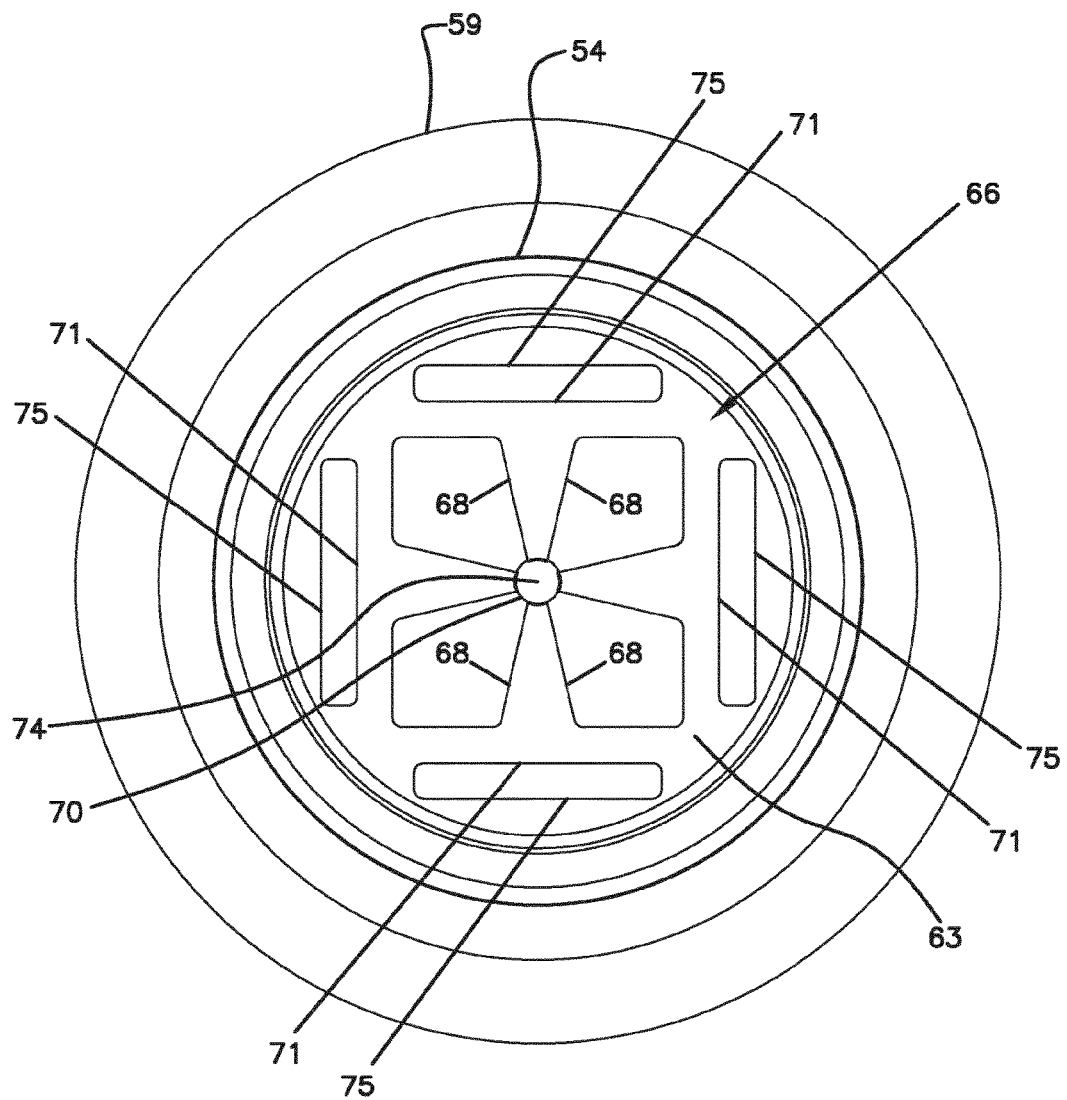
FIG. 11 is an end view of the end face of the ferrule of FIG. 6.

To provide an effective optical connection between two fiber optic connectors, it is desirable for the fibers of the connected fiber optic connectors to be precisely coaxially aligned such that the cores of the optical fibers coaxially align with one another. In this regard, it is desirable for the axial bores 46 of the ferrules 42 to be precisely oriented relative to outer circumferential surfaces 59 (see FIG. 3A) defined by outer diameters of the ferrules 42. This level of precision can be difficult to achieve and maintain. To overcome this issue, aspects of the present disclosure relate to providing a fiber alignment structure 66 (see FIGS. 6 and 11) at the ferrule front end face 54.

In certain examples, the fiber alignment structure 66 is a separate insert/structure that is welded, adhered, bonded, attached or otherwise secured at the front ferrule end face 54. The fiber alignment structure 66 includes a plurality of alignment projections 68 (i.e., members, protrusions elements, etc.) that are uniformly distributed circumferentially about a fiber passage 70 of the fiber alignment structure 66. The alignment projections 66 have end tips 72 that define the circumferential boundary of the fiber passage 70 and are configured to engage the optical fiber at the fiber passage 70 (see FIG. 11). The fiber alignment structure 66 has an elastic feature/construction that allows at least portions of the alignment structure 68 to elastically move in general radial orientations relative to a fiber insertion axis 74 that extends through the fiber passage 70. When optical fiber is inserted through the fiber passage 70, the alignment structure 66 flexes radially outwardly to accommodate the optical fiber and to self-center the optical fiber along the fiber insertion axis 74. In certain examples, the alignment projections 68 elastically clamp and apply self-centering spring loads to the optical fiber to center the optical fiber along the fiber insertion axis 74. In certain examples, the fiber insertion axis 74 generally aligns with the ferrule axis 64. However, it will be appreciated that the alignment structure 66 is precisely located and centered relative to the outer circumference of the ferrule 42 such that the fiber passage 70 is precisely centered relative to the outer circumference of the ferrule 42. In this way, the optical fiber received within the fiber receptacle 70 is also precisely centered relative to the outer circumference of the ferrule 42. In certain examples, the alignment projections 68 are connected to flexible beams 71 that can elastically flex relative to a main body 67 of the fiber alignment structure 66 to allow the alignment projections 68 to elastically move radially relative to the fiber insertion axis 74. The main body 67 can define slots 75 adjacent the flexible beams 71 that accommodate/allow the beams 71 to flex. Other example alignment structures are disclosed at PCT Application No. PCT/EP2013/057073, which is hereby incorporated by reference in its entirety.

Figure 14:
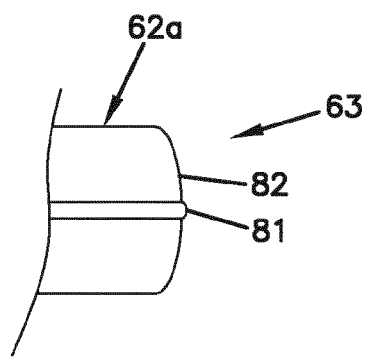
FIG. 14 is a cross-sectional view through the fiber end face.

In certain examples, a fiber end face 63 (i.e., a fiber end or fiber interface end) of the optical fiber 62 is treated to enhance the insertion loss and return loss characteristics of the fiber optic connector 20. In certain examples, the treatment of the fiber end face 63 eliminates the need for polishing of the fiber end face 63. In certain examples, the fiber end face 63 can be treated using an energy (e.g., heat) treatment process as disclosed in PCT Publication No. WO2012/112344, which is hereby incorporated by reference in its entirety. In certain examples, the fiber end face 63 is treated using a heat treatment process such as electric arc treatment, laser irradiation, plasma arc treatment, or other heat treatment technique. It will be appreciated that certain of these terms can overlap in meaning. In certain examples, the heat treatment can be used to provide the fiber end face 63 with a rounded configuration (see FIG. 14). In certain examples, the heat treatment can be used to round the fiber end face 63 at the core and at the cladding. In certain examples, the core can be provided with a radius of curvature that is smaller than a corresponding radius of curvature of the cladding. In certain examples, the end face of the core can have a radius of curvature in the range of 0.14 millimeters (mm) to 4 mm. In certain examples, the end face of the cladding can have a radius of curvature in the range of 0.4 mm to 4 mm. In certain examples, the fiber end face 63 can be heat treated by applying an electric arc to the optical fiber at the fiber front face 63 during a time period in the range of 120 milliseconds to 280 milliseconds, or more preferably during a time period in the range of 150 milliseconds to 250 milliseconds. In certain examples, the electric arc treatment can be applied using a cathode and an anode having a separation distance and wherein the separation distance is in the range of 1.5 mm to 4 mm. In certain examples, the fiber end face 63 can be treated before or after the optical fiber is inserted into the ferrule 42.

It will be appreciated that in certain examples, the optical fiber 62 can be cleaved to define the fiber end face 63. It will be appreciated that the cleave can be a perpendicular cleave oriented at a 90 degree angle relative to the central axis of the optical fiber 62. In other embodiments, the cleave may be an angled cleave that is angled in the range of 5 degrees to 50 degrees, or in the range of 5 degrees to 15 degrees relative to the central longitudinal axis of the optical fiber 62. In certain examples, a treatment station (e.g., a heat treatment station) for providing treatment of the type described above can be provided within a portable tool into which the optical fiber 62 is inserted. An example portable tool of this type is disclosed at PCT Publication No. WO 2012/112344.

In certain examples, after heat treatment, the core protrudes from the cladding at the fiber end face 63. In certain examples, the core can have a protrusion height relative to the cladding in the range from 10 to 200 nanometers, or in the range of 10 to 150 nanometers, or in the range of 30 to 60 nanometers.

In some examples, at least a point along the optical fiber 62 can be axially fixed relative to the connector body 22. In certain implementations, the optical fiber 62 is axially fixed relative to the connector body 22 with the fiber end face 63 precisely located at a desired axial position relative to the front ferrule end face 54 of the ferrule 42 when the ferrule assembly 38 is in a forward-most position relative to the connector body 22. In certain examples, the optical fiber 62 can be anchored relative to the rear piece 26 at a fiber fixation location 73 by a structure such as a clamp, crimp or shape memory sleeve. In certain examples, the shape memory sleeve (e.g., a heat shrink sleeve), the clamp, or the crimp can be used to attach the optical fibers 62 to a fiber securement structure mounted within the rear piece 26. In certain examples, the fiber optic connector 20 is configured such that a fiber buckling region is provided inside the connector body 22 for allowing buckling of the optical fiber 62 between the end face of the fiber and the fiber fixation location. In other examples, at least a point along the optical fiber 62 can be axially fixed relative to the ferrule hub 44 so that the fiber can move relative to the connector body 22.

Figure 15:
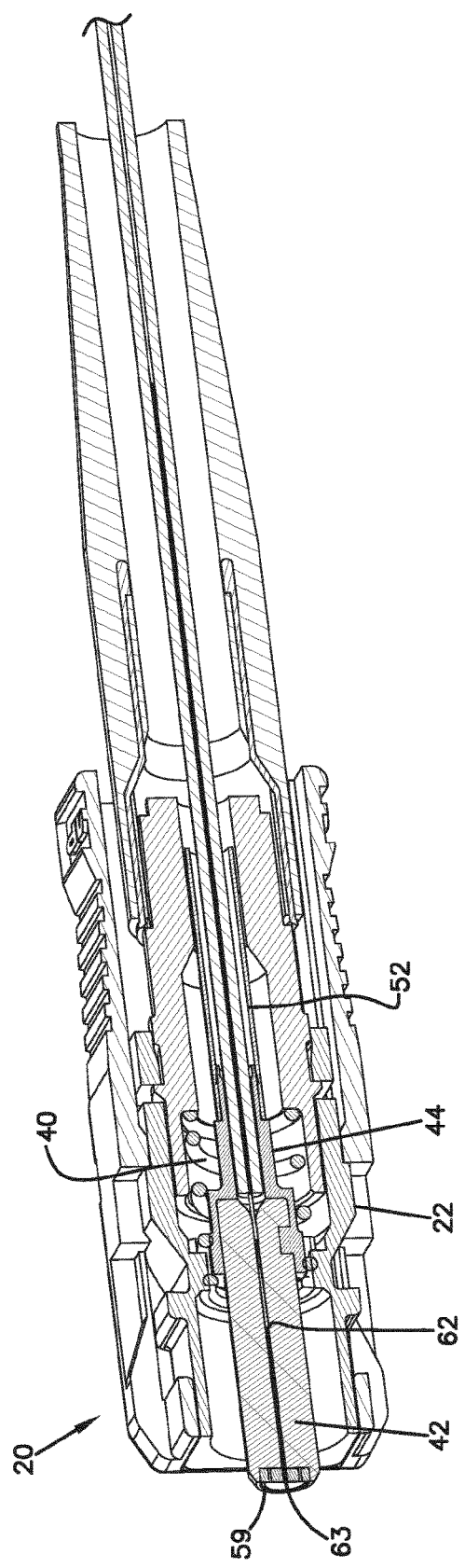
FIG. 15 is a longitudinal cross-sectional view of an example fiber optic connector using a first fiber fixation technique.

FIGS. 15-19 illustrate five example fixation techniques. FIG. 15 illustrates one example fiber optic connector 20 including an optical fiber 62 axially fixed to the elongated sleeve 52 that is coupled to the ferrule hub 44. The fiber 62 moves rearward with the ferrule 42 when the ferrule 42 is biased rearwardly against the spring 40. In certain examples, the fiber end face 63 is movable to a small extent relative to the ferrule front face 59. In certain implementations, the optical fiber 62 is adhesively affixed within the elongated sleeve 52. In certain implementations, the optical fiber 62 is adhesively affixed within the ferrule hub 44. In an example, the optical fiber 62 is installed in the connector 20 at the factory. In another example, the optical fiber 62 can be installed in the connector 20 in the field.

FIGS. 16-19 illustrate another example fiber optic connector 100 having a different type of ferrule assembly 105. The fiber optic connector 100 includes a front connector body 102 defining a plug end adapted to be inserted within a fiber optic adapter. The fiber optic connector 100 also includes a rear connector body 103 configured to be anchored to the end of a fiber optic cable 30. A grip housing 104 is disposed around the connector bodies 102, 103. The ferrule assembly 105 includes a ferrule 106 and a ferrule hub 108 that are mounted together as a unit. The ferrule hub 108 includes an integral extension portion 107 similar to the elongated sleeve 52 described above. A spring 109 biases the ferrule assembly 105 forwardly relative to the connector bodies 102, 103. An optical fiber of the cable 30 extends through the rear connector body 103, through the elongated portion 107 of the ferrule hub 108, and into the ferrule 106.

In FIG. 16, a fixation assembly 110 is at least partially disposed within the ferrule hub elongated portion 107. In certain implementations, the fixation assembly 110 is disposed within an area defined by the ferrule hub elongated portion 107 and the rear connector body 103. The fixation assembly 110 includes an anchoring member 112 and a heat-recoverable tube 114. The optical fiber is fixed to the anchoring member 112 when heat is applied to the heat-recoverable tube 114. In certain implementations, a portion of the cable jacket also can be fixed to the anchoring member 112 using the heat-recoverable tube 114. The anchoring member 112 is mounted and configured to move together with the ferrule assembly 105. The portion of the fiber between the heat-recoverable tube 114 and the fiber end face remains moveable relative to the ferrule 106.

Figure 17:
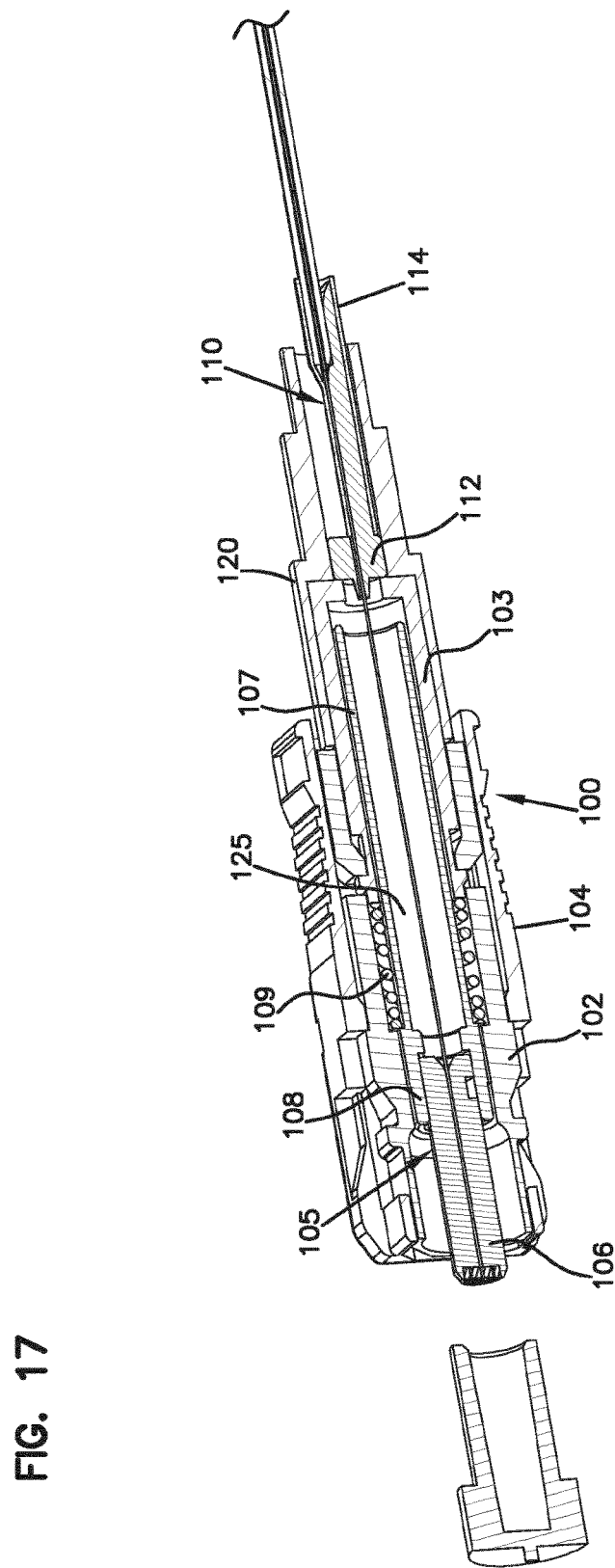
FIG. 17 is a longitudinal cross-sectional view of another example fiber optic connector using a third fiber fixation technique.

In FIG. 17, the fixation assembly 110 is disposed within an extension housing 120 coupled to the rear connector body 103. The fixation assembly 110 does not move with the ferrule assembly 105. Rather, the fixation assembly 110 remains stationary relative to the rear connector body 103. A portion of the optical fiber extends from the fixation assembly 110, through an area 125 within the ferrule hub elongated portion 107, and into the ferrule 106. This portion of the fiber remains moveable relative to the ferrule assembly 105. Accordingly, at least the area 125 provides a buckle zone along which the fiber can bend/flex, thereby allowing the fiber end face to move axially relative to the ferrule 106.

In some implementations, the optical fiber of the cable 30 can be optically coupled (e.g., mechanically spliced) to a ferrule stub fiber at a fixation assembly 130. In the examples shown in FIGS. 18 and 19, the fixation assembly 130 includes an alignment arrangement having a V-groove for coaxially aligning the ferrule stub fiber with the cable fiber and a clamp (e.g., a wedge) for pressing the fibers in the V-groove and for axially fixing the fibers relative to the V-groove. The alignment arrangement and the clamp are mounted and configured to move with the ferrule hub 44.

Figure 18:
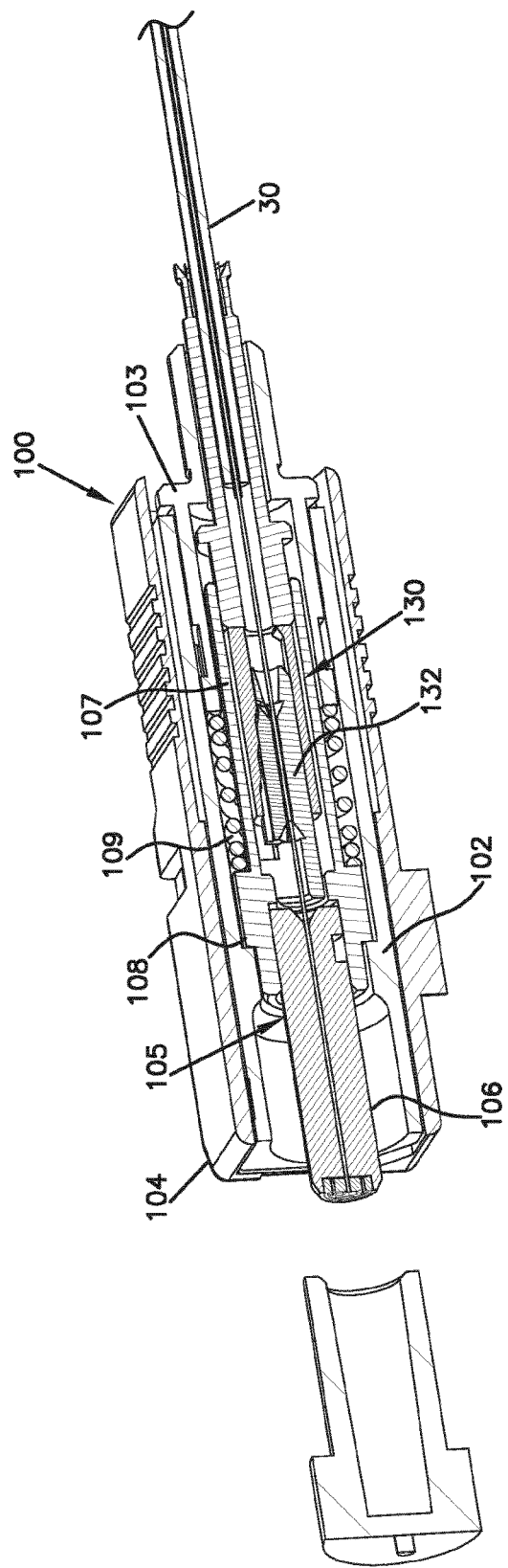
FIG. 18 is a longitudinal cross-sectional view of another example fiber optic connector using a fourth fiber fixation technique.

In FIG. 18, the fixation assembly 130 is at least partially disposed within the ferrule hub elongated portion 107. The wedge member 136 extends partially into the elongated portion 107 to hold the V-groove member 132 and the flat member 134 therebetween. In certain implementations, the fixation assembly 130 is disposed within an area defined by the ferrule hub elongated portion 107 and the rear connector body 103. The portion of the fiber between the fixation member 130 and the fiber end face remains moveable relative to the ferrule 106.

Figure 19:
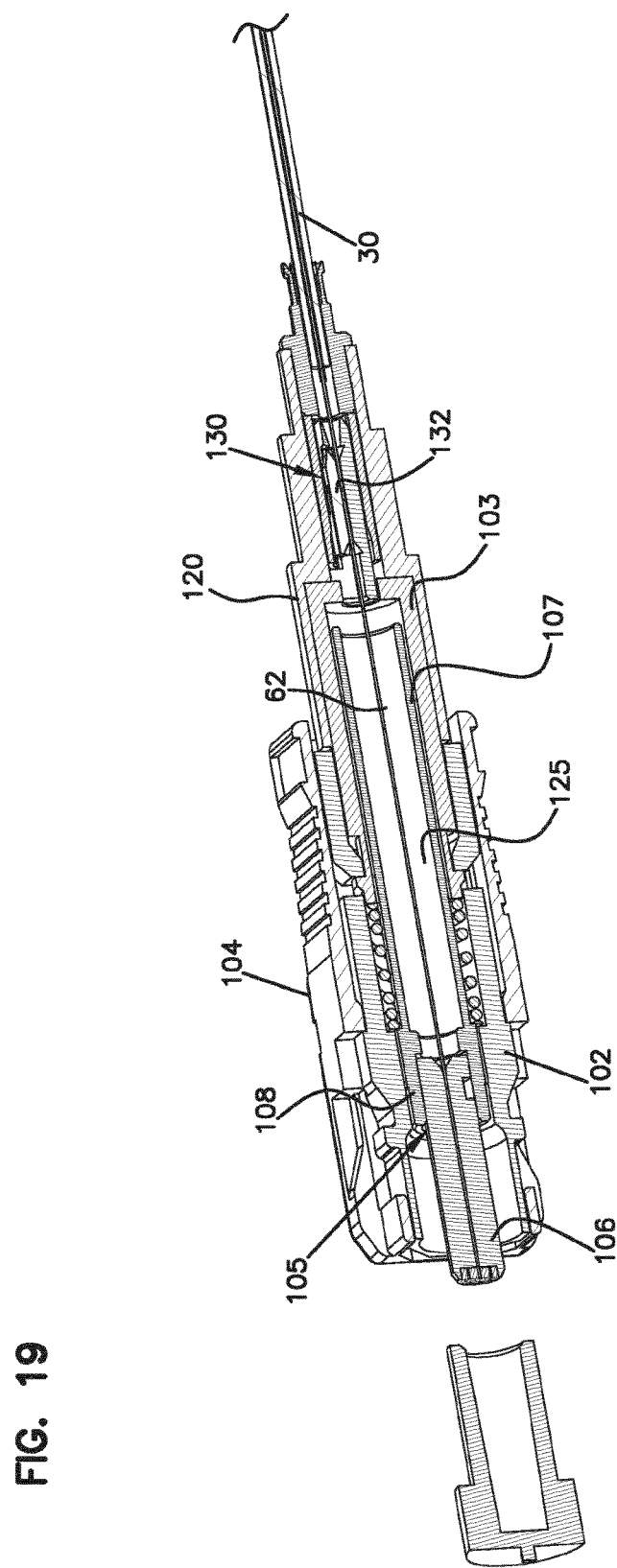
FIG. 19 is a longitudinal cross-sectional view of another example fiber optic connector using a fifth fiber fixation technique.

In FIG. 19, the fixation assembly 130 is disposed within an extension housing 120 coupled to the rear connector body 103. The fixation assembly 130 does not move with the ferrule assembly 105. Rather, the fixation assembly 130 remains stationary relative to the rear connector body 103. A portion of the ferrule stub fiber extends from the fixation assembly 130, through the area 125 within the ferrule hub elongated portion 107, and into the ferrule 106. This portion of the ferrule stub fiber remains moveable relative to the ferrule assembly 105. Accordingly, at least the area 125 provides a buckle zone along which the ferrule stub fiber can bend/flex, thereby allowing the fiber end face to move axially relative to the ferrule 106.

Figure 3A:
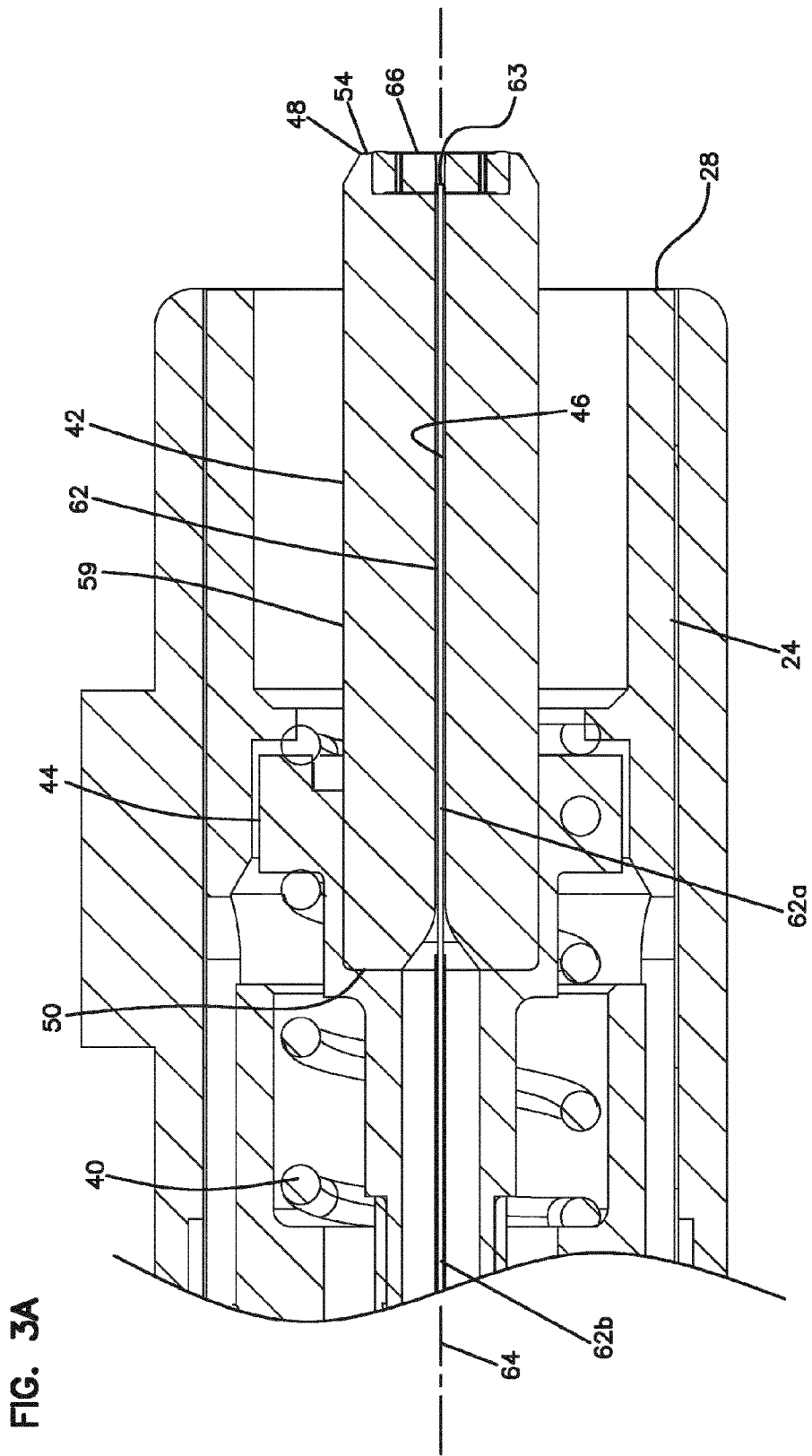
FIG. 3a is a detailed view of a portion of the connector of FIG. 3 with the optical fiber set at a position relative to the ferrule such that an end face of the optical fiber is recessed a predetermined distance relative to an end face of the ferrule.
Figure 3B:
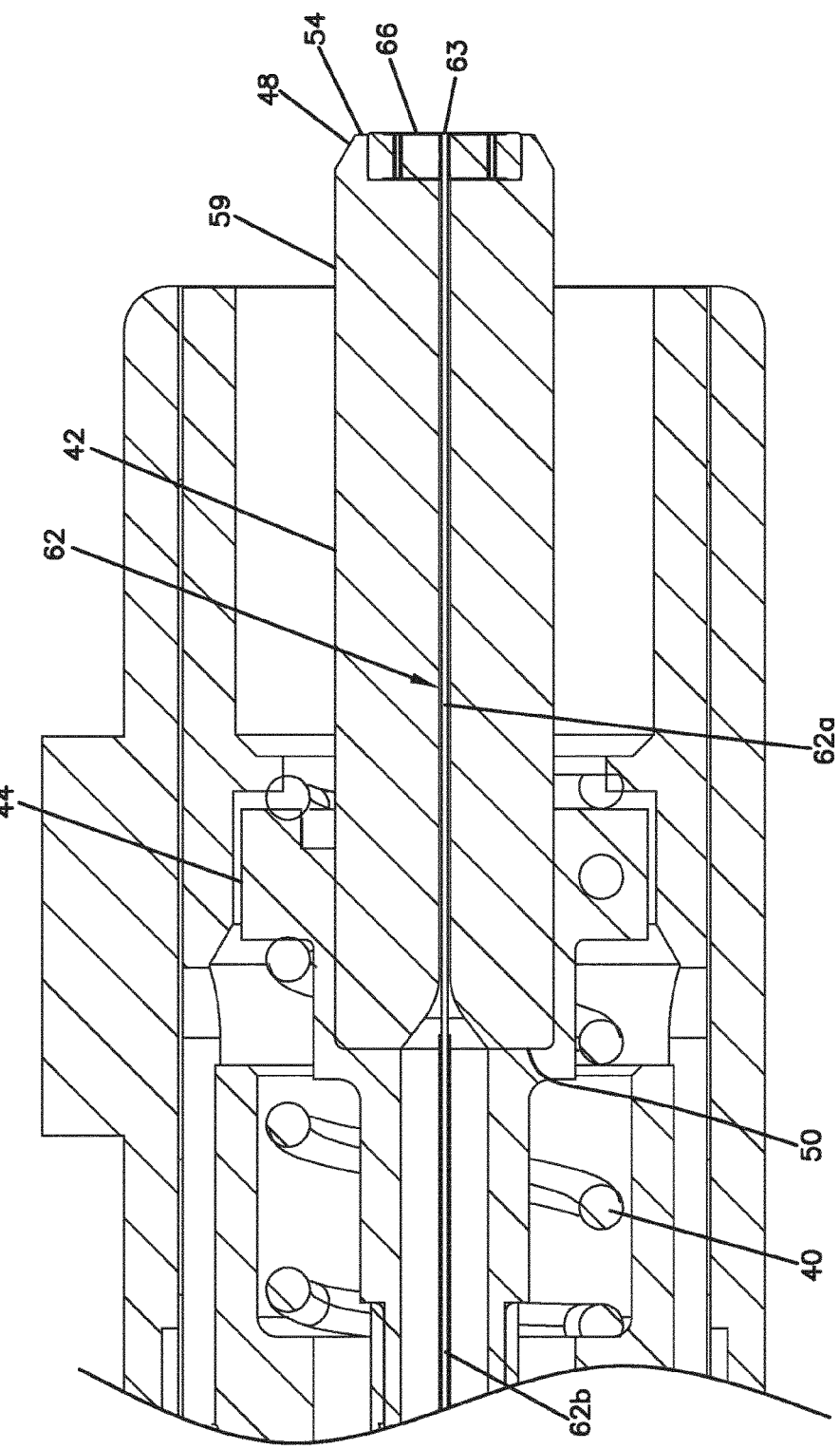
FIG. 3b is a detailed view of a portion of the fiber optic connector of FIG. 3 with the optical fiber set at a position relative to the ferrule such that the end face of the optical fiber is flush with an end face of the ferrule.
Figure 3C:
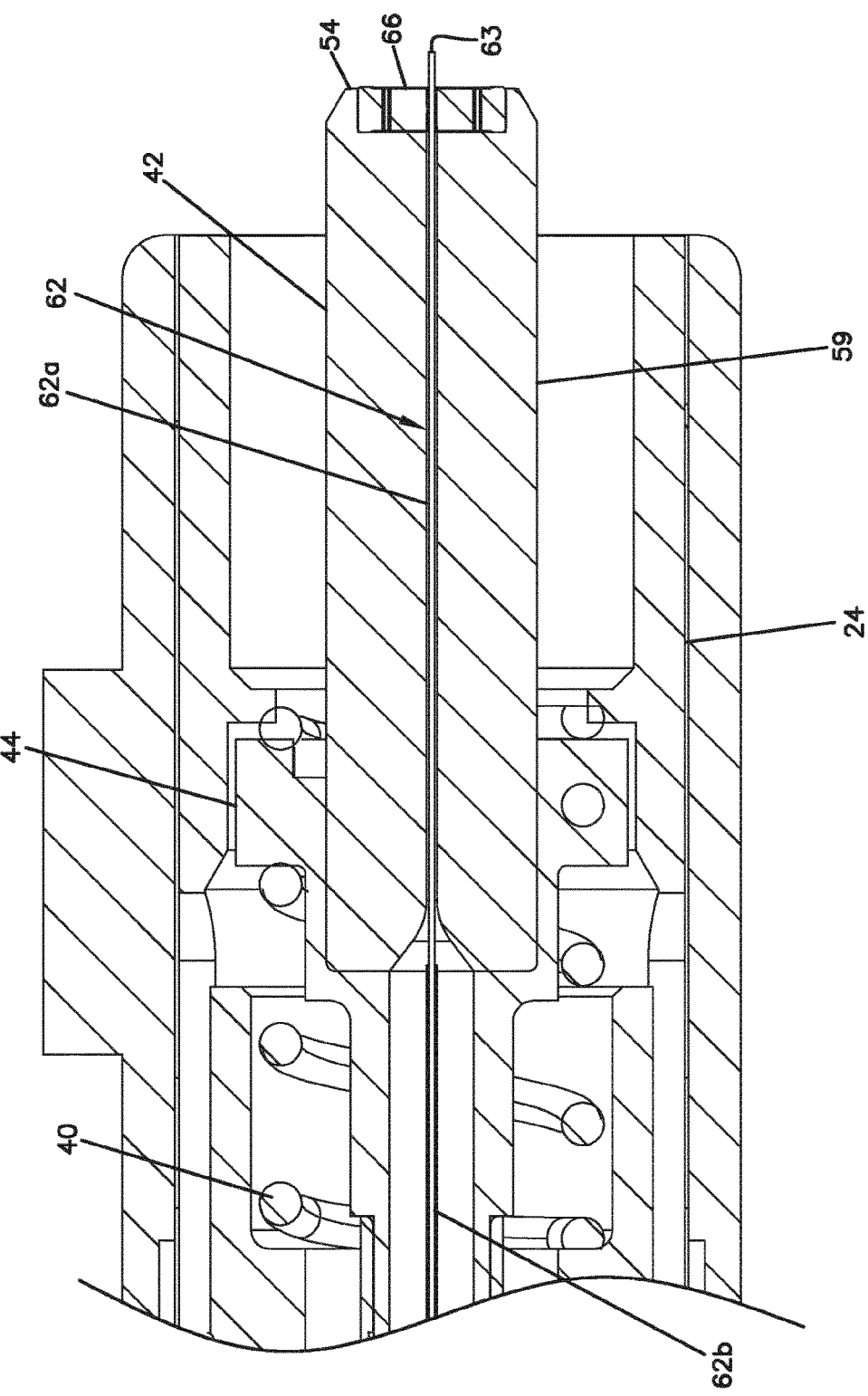
FIG. 3c is a detailed view of a portion of the connector of FIG. 3 showing the optical fiber set at a position where the optical fiber projects a predetermined length beyond the end face of the ferrule.

Referring now to FIGS. 3a-3c, in some implementations, when two fiber optic connectors 20 are interconnected, the front ferrule end faces 54 engage one another. Contact between the front faces 54 of the ferrules 42 causes the ferrules 42 to move rearwardly within their corresponding connector bodies 22 against the bias of their corresponding springs 40. The ferrules 42 can move relative to the optical fibers 62 disposed within the ferrules 42. In certain implementations, this rearward movement causes the fiber end faces 63 to abut against one another (see FIG. 10) to provide effective physical contact between the fiber end faces 63. In certain implementations, abutting fiber end faces 63 causes the optical fibers 62 to move rearwardly relative to the connector bodies 22.

Figure 7:
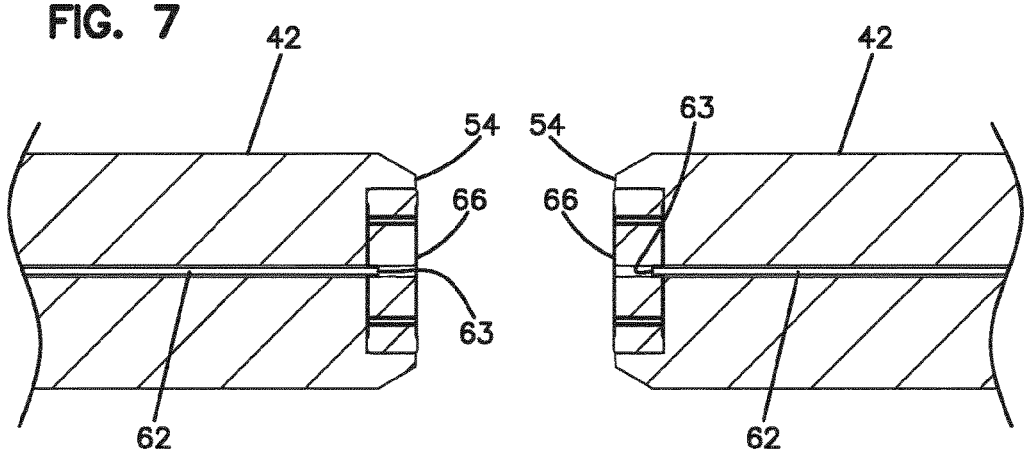
FIG. 7 shows two fiber optic connectors having recessed optical fibers prior to the connectors being interconnected.

FIG. 3a shows one example configuration in which the optical fiber 62 is fixed in position relative to the connector body 22 at the fiber fixation location 73 such that the fiber end face 63 is recessed a predetermined amount relative to the front ferrule end face 54 when the ferrule 42 is biased to its forward-most position relative to the connector body 22 and the portion of the fiber 62 forward of the fixation location 73 is not buckled. In this configuration, the end face of the optical fiber 62 is protected within the ferrule 42. FIG. 7 shows two fiber optic connectors with recessed optical fibers prior to connection. When the two fiber optic connectors are interconnected together, the front faces 54 of the ferrules 42 engage one another thereby causing each of the ferrules 42 to be forced in a rearward direction relative to their corresponding connector bodies 22. As this occurs, the optical fibers 62 within the ferrules 42 slide forwardly within the ferrule bores relative to the ferrules 42 until the fiber end faces 63 abut one another thereby providing effective physical contact between the glass fiber end faces 63 (see FIG. 10). Contact between the fiber end faces 63 can also cause the portions of the optical fibers 62 forwardly located with respect to the fiber fixation locations to move rearwardly relative to their corresponding connector bodies 22. To accommodate this type of movement, a buckling region can be provided within each of the fiber optic connectors 20 in the region between the ferrule end face 54 and the fiber fixation location 73.

Figure 8:
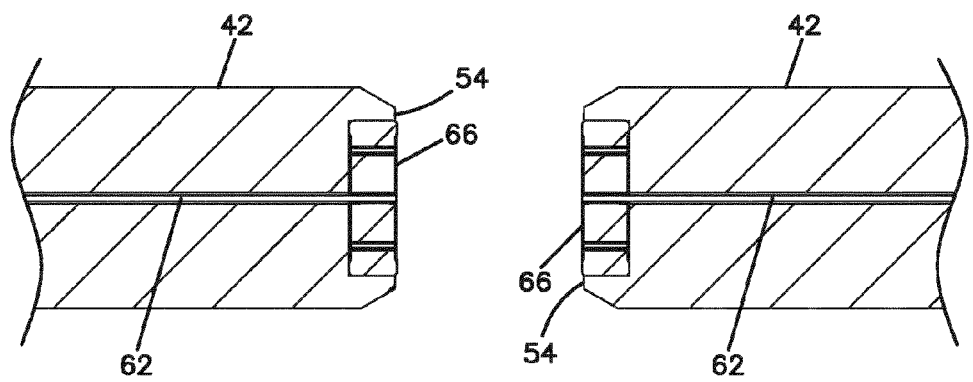
FIG. 8 shows two fiber optic connectors having flush optical fibers prior to the fiber optic connectors being interconnected.

FIG. 3b shows another example configuration in which the optical fiber 62 is fixed in position relative to the connector body 22 at the fiber fixation location 73 such that the fiber end face 63 is flush relative to the front ferrule end face 54 when the ferrule 42 is biased to its forward-most position relative to the connector body 22 and the portion of the fiber 62 forward of the fixation location 73 is not buckled. FIG. 8 shows a pair of this type of connector prior to being interconnected together. When such connectors are interconnected, the front ferrule end faces 54 engage one another at approximately the same time that the fiber end faces 63 of the optical fibers 62 engage one another. Contact between the front faces 54 of the ferrules 42 causes the ferrules 42 to move rearwardly within their corresponding connector bodies 22 against the bias of their corresponding springs 40. This movement causes the fiber end faces 63 to abut against one another (see FIG. 10) to provide effective physical contact between the fiber end faces 63.

Figure 10:
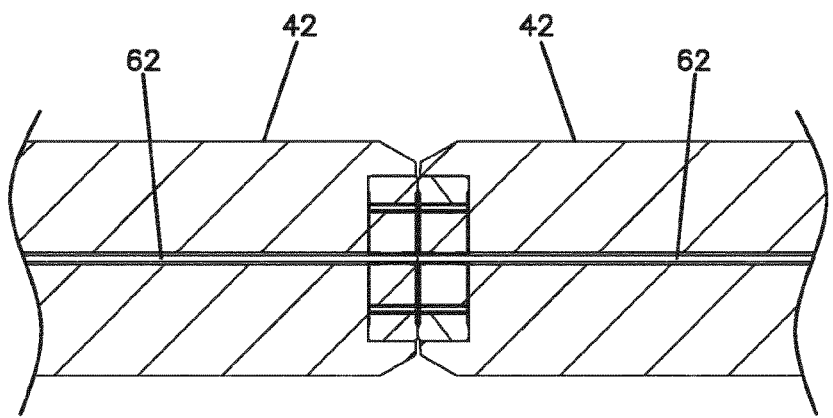
FIG. 10 shows any pair of the fiber optic connectors of FIGS. 7-9 in a connected state.
Figure 9:
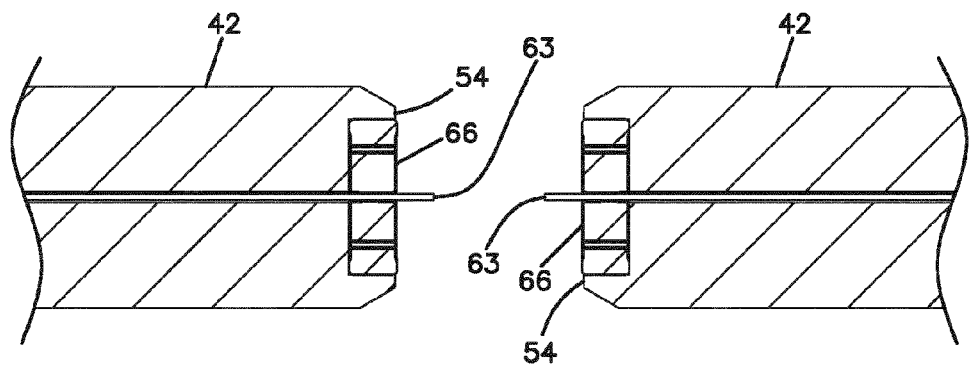
FIG. 9 shows two fiber optic connectors having projecting optical fibers prior to the fiber optic connectors being interconnected.

FIG. 3c shows another example configuration in which the optical fiber 62 is fixed in position relative to the connector body 22 at the fiber fixation location 73 such that the fiber end face 63 is posited a predetermined spacing in front of the front ferrule end face 54 when the ferrule 42 is biased to its forward-most position relative to the connector body 22 and the portion of the fiber 62 forward of the fixation location 73 is not buckled. FIG. 9 shows two of such connectors in alignment with one another prior to being interconnected together. When the fiber optic connectors are interconnected together, the fiber end faces 63 contact one another prior to the front faces 54 of the ferrules 42 contacting one another. This causes the optical fibers 62 to slide rearwardly within their corresponding ferrules 42 during the connection process. As with previously described embodiments, buckling regions can be provided within the fiber optic connectors for accommodating movement of the forward portions of the optical fibers 62 relative to their corresponding connector bodies 22 during the connection process. The connection process continues until the front faces 54 of the ferrules 42 abut one another and the ferrules 42 are forced rearwardly relative to their corresponding connector bodies 22 against the bias of their corresponding springs 40. FIG. 10 shows the connectors in a connected state. In alternative examples, the spring 40 may be optional.

In certain examples, an automated process can be used to set the position of the fiber end face 63 relative to the front face 54 of the ferrule 42. For example, a camera can be used to detect a protrusion length or recess depth of the fiber end face relative to the front face 54 of the ferrule 42. Based on the measurement provided by the camera data, an electronic controller having suitable control logic (e.g., a feedback control loop) can interface facing with the camera can control automated equipment (e.g., motors, robotics, drives, etc.) to automatically move the optical fiber 62 relative to the ferrule 42 until the desired positioning of the fiber end face 63 relative to the ferrule end face 54 is achieved. Once the desired positioning has been achieved, the electronic controller can control other automated equipment that fixes the optical fiber 62 at the fixation location 73. In certain examples, the camera, the controller and the automated equipment can be mounted within a portable tool in which the optical fiber can be inserted. While the fiber is within the tool, the tool can strip the fiber, cleave the fiber, clean the fiber, heat treat the end of the fiber, inspect the fiber, position the fiber relative to the ferrule, fix the fiber within the connector body, and anchor the connector to the cable. Certain tools can provide all of the above operations, or any selected groups of the operations.

From the forgoing detailed description, it will be evident that modifications and variations can be made without departing from the spirit and scope of the disclosure.

PARTS LIST

20 Fiber optic connector
22 Connector body
24 Front piece
26 Rear piece
28 Plug end
30 Fiber optic cable
32 Cable anchoring region
34 Crimp sleeve
36 Strain relief boot
38 Ferrule assembly
40 Spring
42 Ferrule
44 Hub
46 Axial bore
48 Front end
50 Rear end
52 Elongated sleeve
54 Ferrule front end face
56 Release sleeve
58 Shoulders
59 Outer circumferential surface
60 Dust cap
62 Optical fiber
62a Bare glass portion
62b Coated portion 63 Fiber end face
66 Fiber alignment structure
67 Main body
68 Fiber alignment projection
70 Fiber passage
71 Beam
72 End tip
73 Fiber fixation location
74 Fiber insertion axis
75 Slot
81 Core
82 Cladding layer
83 Coating layer
100 fiber optic connector
102 front connector body
103 rear connector body
104 grip housing
105 ferrule assembly
106 ferrule
107 extension portion
108 ferrule hub
109 spring
110 fixation assembly
112 anchoring member
114 heat-recoverable tube
120 extension housing
125 area
130 fixation assembly
132 V-groove member

What is claimed is:

1. A fiber optic connector comprising:
a ferrule having a front end and a rear end, the ferrule defining an axial bore that extends through the ferrule between the front end and the rear end, the ferrule including a ferrule axis that extends along the axial bore;
an optical fiber positioned within the axial bore that is movable relative to the ferrule within the axial bore along the ferrule axis; and
a fiber alignment structure attached at a front ferrule end face of the ferrule, the fiber alignment structure defining a fiber passage, the fiber alignment structure having an elastic construction.

2. The fiber optic connector of claim 1, wherein the fiber alignment structure has an elastic construction that allows at least portions of the alignment structure to elastically move in general radial orientations relative to a fiber insertion axis that extends through the fiber passage.

3. The fiber optic connector of claim 2, wherein the fiber insertion axis generally aligns with the ferrule axis.

4. The fiber optic connector of claim 2, wherein the fiber alignment structure includes a plurality of alignment projections having end tips distributed about a circumference of the fiber passage.

5. The fiber optic connector of claim 4, wherein the alignment projections are attached to flexible elastic beams that deflect when the optical fiber is inserted through the fiber passage.

6. The fiber optic connector of claim 5, wherein the flexible beams elastically flex relative to a main body of the fiber alignment structure to allow the alignment projections to elastically move radially relative to the fiber insertion axis.

7. The fiber optic connector of claim 6, wherein the main body defines slots adjacent the flexible beams that enable the beams to flex.

8. The fiber optic connector of claim 1, wherein the fiber alignment structure is a separate insert/structure that is welded, adhered, bonded, attached or otherwise secured at the front ferrule end face.

9. The fiber optic connector of claim 1, wherein the fiber optic connector includes a connector body in which the ferrule is mounted, and wherein the optical fiber is fixed relative to the connector body.

10. The fiber optic connector of claim 1, wherein the fiber optic connector includes a connector body in which the ferrule is mounted, and wherein the optical fiber is fixed relative to the ferrule.

11. The fiber optic connector of claim 9, wherein a fiber end face is recessed relative to the front ferrule end face when the connector is not in use.

12. The fiber optic connector of claim 9, wherein a fiber end face is flush relative to the front ferrule end face when the connector is not in use.

13. The fiber optic connector of claim 9, wherein a fiber end face is forwardly offset from the front ferrule end face when the connector is not in use.

14. The fiber optic connector of claim 1, wherein the optical fiber includes a ferrule stub fiber.

15. The fiber optic connector of claim 1, wherein the optical fiber has a fiber end face that has been energy treated to round the fiber end face.

16. The fiber optic connector of claim 15, wherein the fiber end face has been heat treated by a process selected from the group consisting of: laser irradiation and plasma arc treatment.

17. The fiber optic connector of claim 15, wherein the optical fiber includes a core and a cladding layer, wherein an end face of the core can have a radius of curvature in the range of 0.14 mm to 4 mm, and an end face of the cladding can have a radius of curvature in the range of 0.4 mm to 4 mm.

18. The fiber optic connector of claim 1, wherein the optical fiber is axially fixed to an elongated sleeve coupled to a ferrule hub that carries the ferrule.

19. The fiber optic connector of claim 1, wherein a fixation assembly is at least partially disposed within a ferrule hub that carries the ferrule, the fixation assembly including an anchoring member and a heat recoverable tube.

20. The fiber optic connector of claim 1, wherein a fixation assembly is disposed within an extension housing coupled to a rear connector body.

21. The fiber optic connector of claim 1, wherein a fixation assembly is at least partially disposed within a ferrule hub elongated portion, the fixation assembly including an alignment arrangement defining a V-groove.

22. The fiber optic connector of claim 1, wherein a fixation assembly is disposed within an extension housing coupled to a rear connector body, the fixation assembly including an alignment arrangement defining a V-groove.

23. A fiber optic connector comprising:
a ferrule having a front end and a rear end, the ferrule defining an axial bore that extends through the ferrule between the front end and the rear end, the ferrule including a ferrule axis that extends along the axial bore;
an optical fiber positioned within the axial bore that is movable relative to the ferrule within the axial bore along the ferrule axis; and
a fiber alignment structure attached at a front ferrule end face of the ferrule, the fiber alignment structure including a plurality of alignment projections having end tips distributed about a circumference of a fiber passage through the fiber alignment structure.

24. The fiber optic connector of claim 23, wherein the alignment projections are attached to flexible elastic beams that deflect when the optical fiber is inserted through the fiber passage.

25. The fiber optic connector of claim 24, wherein the flexible beams elastically flex relative to a main body of the fiber alignment structure to allow the alignment projections to elastically move radially relative to the fiber insertion axis.

26. The fiber optic connector of claim 25, wherein the main body defines slots adjacent the flexible beams that enable the beams to flex.

27. A fiber optic connector comprising:
 a ferrule having a front end and a rear end, the ferrule defining an axial bore that extends through the ferrule between the front end and the rear end, the ferrule including a ferrule axis that extends along the axial bore;
 an optical fiber positioned within the axial bore that is movable relative to the ferrule within the axial bore along the ferrule axis;
characterized in that the ferrule includes a fiber alignment structure attached at a front ferrule end face of the ferrule, the fiber alignment structure defining a fiber passage, the fiber alignment structure having an elastic construction when the optical fiber is inserted through a fiber passage of the fiber alignment structure, the elastic construction allowing at least portions of the alignment structure to elastically move in general radial orientations relative to a fiber insertion axis that extends through the fiber passage, the fiber alignment structure including a plurality of alignment projections having end tips distributed about a circumference of the fiber passage.

* * * * *